UNITED STATES PATENT OFFICE.

GEORGE W. HERBEIN, OF SAN FRANCISCO, CALIFORNIA.

ART OF TRANSFORMING WOOD AND OTHER CELLULOSE-CONTAINING MATERIALS.

1,235,895.  Specification of Letters Patent.  Patented Aug. 7, 1917.

No Drawing.  Application filed August 5, 1916.  Serial No. 113,284.

*To all whom it may concern:*

Be it known that I, GEORGE W. HERBEIN, a citizen of the United States, residing at the city and county of San Francisco and State of California, have invented certain new and useful Improvements in the Art of Transforming Wood and other Cellulose-Containing Materials, of which the following is a specification.

My invention relates to the art of transforming wood and other cellulose-containing material, that is, materials of plant origin, having a fiber or grain in whole or in part, and either homogeneous or composed of adhesive or cohesive layers.

The object of my invention is to so change the nature of these substances, that they become adapted for easy, firm and uniform cutting and leave a smooth, regular, substantially fiberless and grainless surface. This peculiarity adapts them for a variety of uses in many arts, such, for example, as carving, frame-making, rulers, pen holders, and particularly pencils.

My invention consists in the novel process which I shall now fully describe.

I boil the wood or other like cellulose-containing material at a temperature ranging between 340 and 400 degrees Fahrenheit, in paraffin for a period of about 40 minutes. For example, I have taken incense cedar wood and boiled it in paraffin maintaining the temperature at from 380 to 400 degrees Fahrenheit for 40 minutes.

Before treatment the wood was tough with a woolly grain and cut with ragged edges. After treatment it could be sharpened well and easily even with a blade not very sharp. It left a smooth close surface with no ragged edges. The blade slipped through it smoothly with no interference or misdirection. In a mechanical pencil sharpener it acted perfectly.

In some cases, I may add resin to the paraffin. I have found that this enhances the desired result in that it acts as an absorbent for surplus paraffin and prevents any tendency to greasiness. For example, in the case above cited, resin was added.

Also, I may initially color the wood. For example, in the case given above, I previously colored the cedar with an alcoholic solution of anilin dyes, making allowance for the subsequent slight darkening of the material under treatment. The philosophy of the transformation or change may be a matter of opinion. In giving mine, I can only say that it appears to be as follows.

The fibers, cellular and fibrous textures of wood and other cellulose containing materials, in many cases are tough, hard and uneven, and in consequence do not yield readily to cutting and shaping into forms.

Now, I have found, by numerous tests and experiments that these substances when heated in paraffin, either alone or mixed with resin, do not change their nature in the manner I desire, when the temperature is below, say, 306 degrees Fahr. They seem simply to absorb the paraffin or the paraffin and resin, leaving them soggy, heavy, saturated and greasy. But at a higher temperature, and below that at which they will char, a material and fundamental change takes place. This change I may characterize as a kind of disintegration, weakening, partial destruction and breaking up of the cellular, fibrous structures and grain, adapting the substances so transformed to yield readily and smoothly to cutting tools, even dull ones; and, at the same time, instead of being weighty, soggy, greasy and pitchy, they resume their lightness, a fact which is probably due to their parting under the higher degree of heat with their own moisture, oils, etc., and having substituted the lighter paraffin.

I, therefore, regard temperature as essential, but in giving the range from 340 to 400 degrees Fahr., I mean these figures as approximate and do not limit myself to them absolutely, for the change may take place somewhat below the lower figure, and may still be effective without charring somewhat above the higher figure. The essential feature is the transformation itself. The same may be said with regard to the time period. The time given above is only approximate; it may be longer or shorter and still produce the desired change. This will necessarily vary.

I claim:—

1. The herein described process of transforming wood, and other cellulose containing materials, consisting in boiling the same in paraffin for approximately 40 minutes at a temperature ranging approximately between 340 and 400 degrees Fahrenheit.

2. The herein described process of transforming wood, and other cellulose containing materials, consisting in boiling the same in paraffin and resin for approximately 40 minutes at a temperature ranging approximately between 340 and 400 degrees Fahrenheit.

In testimony whereof I have signed my name to this specification in the presence of two subscribing witnesses.

GEORGE W. HERBEIN.

Witnesses:
  WM. F. BOOTH,
  D. B. RICHARDS.